(12) United States Patent
Acikgoez et al.

(10) Patent No.: US 10,230,081 B2
(45) Date of Patent: Mar. 12, 2019

(54) VOLTAGE-PROTECTED PRODUCIBLE MOTOR VEHICLE BATTERY

(71) Applicant: AUDI AG, Ingolstadt (DE)

(72) Inventors: Erdal Acikgoez, Reichertshofen (DE); Jörg Schmidt, Ingolstadt (DE); Roman Ranzinger, Eichstätt (DE)

(73) Assignee: AUDI AG, Ingolstadt (DE)

( * ) Notice: Subject to any disclaimer, the term of this patent is extended or adjusted under 35 U.S.C. 154(b) by 83 days.

(21) Appl. No.: 15/324,442

(22) PCT Filed: Jun. 24, 2015

(86) PCT No.: PCT/EP2015/001265
§ 371 (c)(1),
(2) Date: Jan. 6, 2017

(87) PCT Pub. No.: WO2016/005028
PCT Pub. Date: Jan. 14, 2016

(65) Prior Publication Data
US 2017/0200929 A1     Jul. 13, 2017

(30) Foreign Application Priority Data
Jul. 8, 2014 (DE) .......... 10 2014 010 067

(51) Int. Cl.
*H01M 2/24* (2006.01)
*H01M 2/10* (2006.01)
(Continued)

(52) U.S. Cl.
CPC ......... *H01M 2/1077* (2013.01); *H01M 2/206* (2013.01); *H01M 10/425* (2013.01); *H01M 2010/4271* (2013.01); *H01M 2220/20* (2013.01)

(58) Field of Classification Search
CPC .. H01M 2/1077; H01M 2/206; H01M 10/425; H01M 2010/4271; H01M 2220/20
See application file for complete search history.

(56) References Cited

U.S. PATENT DOCUMENTS

2012/0183831 A1   7/2012   Jeong et al.
2013/0115493 A1   4/2013   Fuhr et al.
(Continued)

FOREIGN PATENT DOCUMENTS

CN     102024976 A     4/2011
CN     102751542 A     10/2012
(Continued)

OTHER PUBLICATIONS

International Search Report issued by the European Patent Office in International Application PCT/EP2015/001265.
(Continued)

*Primary Examiner* — Jane J Rhee
(74) *Attorney, Agent, or Firm* — Henry M. Feiereisen LLC

(57) ABSTRACT

A motor vehicle battery includes multiple battery modules arranged in a row adjacent each other, each said multiple battery modules comprising a plug connection, a voltage tap and a bus connection integrated in the plug connection, and a control circuit coupled with the bus connection, and multiple galvanic battery cells, each of said multiple galvanic battery cells being connected witch each other by the plug connection; and a connection device configured as a single plugin module and comprising a battery management system, wherein the connection device is plugged onto all plug connections of the multiple battery modules and connects the voltage taps of all battery modules with a high-voltage battery connection and connects the bus connections of all battery modules with the battery management system.

10 Claims, 16 Drawing Sheets

(51) Int. Cl.
*H01M 2/20* (2006.01)
*H01M 10/42* (2006.01)

(56) References Cited

U.S. PATENT DOCUMENTS

| | | | |
|---|---|---|---|
| 2013/0143086 A1* | 6/2013 | Lee | H01M 2/1077 |
| | | | 429/91 |
| 2014/0117754 A1 | 5/2014 | Kreutzer et al. | |
| 2015/0028669 A1 | 1/2015 | Schmidt et al. | |

FOREIGN PATENT DOCUMENTS

| | | |
|---|---|---|
| DE | 198 10 746 | 9/1999 |
| DE | 10 2011 101 352 | 11/2012 |
| DE | 21 2011 100 153 | 7/2013 |
| DE | 10 2012 011 607 | 12/2013 |
| EP | 2 328 205 | 6/2011 |

OTHER PUBLICATIONS

Chinese Search Report dated Aug. 3, 2018 with respect to counterpart Chinese patent application 2015800367901.

Translation of Chinese Search Report dated Aug. 3, 2018 with respect to counterpart Chinese patent application 2015800367901.

* cited by examiner

VOLTAGE-PROTECTED PRODUCIBLE MOTOR VEHICLE BATTERY

CROSS-REFERENCES TO RELATED APPLICATIONS

This application is the U.S. National Stage of International Application No. PCT/EP2015/001265, filed Jun. 24, 2015, which designated the United States and has been published as International Publication No. WO 2016/005028 and which claims the priority of German Patent Application, Serial No. 10 2014 010 067.7, filed Jul. 8, 2014, pursuant to 35 U.S.C. 119(a)-(d).

BACKGROUND OF THE INVENTION

The invention relates to a motor vehicle battery with multiple battery cells for generating a high voltage. The term high voltage in the context of the present invention means an electrical voltage greater than 60 V, in particular greater than 100 V. The invention also relates to a motor vehicle in which at least one motor vehicle battery according to the invention is provided and a method for producing the motor vehicle battery according to the invention. Finally the invention also includes a plugin module, which can be installed in the motor vehicle battery.

During manufacture of a motor vehicle battery its individual components are assembled, with each component providing a function of the motor vehicle battery. The components are battery modules, which respectively provide a partial voltage of the high voltage, the high-voltage cabling, which connects the modules with each other, the battery management system for coordinating control circuits in the battery modules and the associated low-voltage cabling, which connects the battery management system with the control circuits in the battery modules. The term low voltage in the context of the present invention means an electrical voltage of smaller than 60 V.

The assembly of all these components is extremely complicated and harbors a great potential for errors, in particular during assembly in the high-voltage range. The connection of the high-voltage cabling on the battery modules the module voltages a total voltage results from of the battery modules, which increases with each newly connected battery module until the high voltage is reached. For a technician this working step can therefore pose a life threatening risk, which has to be addressed by complicated protective measures.

A further problem is the multitude of components, which require a large installation space in the battery system, which in turn adversely affects the volumetric energy density of the motor vehicle battery. In addition the complexity of the battery construction leads to corresponding costs in the development phase and during manufacture. For each component there are different suppliers, each of which has to be managed differently.

From DE 10 2011 101 352 A1 a high-voltage battery for a vehicle is known in which multiple cell modules are fastened on a carrier plate and are connected with each other by an outlet socket or distribution socket, which his configured as a plugin module.

An individual battery module is described in DE 21 2011 100 153 U1. This battery module includes electrochemical plate cells, which can be contacted via band electrodes. Overall, the electrical battery module has the shape of a plate.

With regard to control circuits, which can be integrated in battery modules, such a control circuit is disclosed in DE 198 10 746 A1. On segments of a board of this control circuit taps are located for the temperature and the voltage of individual galvanic battery cells and on at least one segment data lines for common inputs and outputs of a data bus connection.

SUMMARY OF THE INVENTION

The invention is based on the object to provide a compact voltage-protected installable motor vehicle battery.

The object is solved by the subject matter of the independent claims. Advantageous refinements of the invention are set forth in the dependent claims.

According to the invention a motor vehicle battery is provided, which is in particular a high-voltage battery or traction battery. The motor vehicle battery has multiple battery modules each of which has multiple galvanic battery cells, which are connected with a common cell connection and a control circuit, which is coupled with a bus connection. The mentioned cell connection of each battery cell serves respectively as a voltage tap of the electrical voltage produced by the battery cells, i.e., the module voltage which forms a partial voltage for the high voltage. The partial voltage is in particular smaller than a high voltage. The control circuit can be a control circuit known from the state of the art, which is also referred to as CMC (Cell Module Controller). The control circuit can for example be provided for voltage monitoring and/or temperature monitoring in the battery module.

All battery modules are connected with each other by a connection device by which the cell connections of all battery modules are connected with a high-voltage battery connection and by which the bus connections of all battery modules are connected with a battery management system of the motor vehicle battery.

In order to provide a motor vehicle battery that is compact and can be produced from the battery modules in a voltage-protected manner, the invention provides to respectively integrate in each battery module the (in particular di-polar) voltage tap, and the bus connection in a common plug connection. The connection contacts are thus preferably oriented along a common plugin direction. Correspondingly the connection device, which on one hand itself connects the voltage taps with each other and on the other hand couples the bus connections with the battery management system, is configured as a single plugin module, which is plugged onto all plug connections and includes the battery management system. The plug connections of all battery modules are therefore arranged in the motor vehicle battery series adjacent each other, for example above each other.

The configuration of the motor vehicle battery according to the invention allows implantation of the following advantageous method according to the invention. The battery modules are stacked, wherein the plug connections remain electrically separated from each other. This avoids that during stacking of the battery modules a total voltage is generated, which is greater than the partial voltage of each battery module. The plug connections are oriented in a row in the described manner. Then the plugin module is pushed onto the oriented plug connections. As a result all taps are connected simultaneously with each other so that their total voltage results in the high voltage. At the same time the bus connections of all battery modules are connected with the battery management system.

In other words it is advantageously possible to stack and orient the battery modules at low voltage and to connect all voltage taps with a single, preferably the last, mounting step by pushing on the plugin module without having to perform further manufacturing steps on the motor vehicle battery that may pose a risk to the technician.

Overall this has the advantage that the motor vehicle battery can be assembled from prefabricated parts none of which generates the high voltage, and the high voltage is only generated with a single work step by attaching the plugin module during assembly.

Preferably each battery module has its own housing by which the battery cells and the control circuit are electrically insulated against an environment of the battery module. This has the advantage that each battery module can be handled as an individual, closed component. The housing is in particular made of plastic and has fastening devices, for example through-holes or latching connectors, by means of which the battery modules can for example be screwed or latched together and by means of which the battery modules can be fastened on a structural component of a motor vehicle, for example a floor plate.

Each battery module is preferably configured as a flat plate. For this purpose the battery cells are provided in the battery modules respectively as film cells. Such film cells or pouch cells are known from the state of the art. Providing plate shaped battery modules has the advantage that the adjacently arranged plugin contacts of all batteries can be connected with each other by a relatively small plugin module.

The invention also includes the plugin module. The plugin module has the advantage that the battery modules can be connected with each other in a single work step in which the high voltage is then generated at the motor vehicle battery. The plugin module has a housing, which is pushed with a plugin side onto the adjacently arranged plug connections of the battery modules. Correspondingly the plugin side has multiple adjacently arranged connection fields each of which has an electrical contact pair for pushing onto the voltage tap of a battery module and a bus connection for connection with the bus connection of the same battery module. In the housing a connection device is arranged by which the contact pairs of the contact fields are connected with each other. The connector allows for example accomplishing a serial connection of the voltage taps of the battery modules. In addition a battery management system is arranged in the housing, which is coupled with the respective bus connections of all contact fields. Via the plugin module also the high voltage of the motor vehicle battery in the motor vehicle can be tapped, i.e., the high voltage can for example be conducted to the motor. For this purpose a connection device with a high-voltage connection arranged on the housing is provided for outputting the high voltage formed via the connected connection fields in the connection unit.

Preferably in the plugin module the respective contact pair in the contact fields is formed by two electrical contacts that are arranged or inserted in a respective plugin shaft. This prevents electrical arcs and flashovers when plugging the plugin module onto the battery modules. In the context of the invention an insertion shaft means a shaft made of an electrically insulating material in a housing wall.

The high-voltage connection is also preferably configured touch-protected, by virtue of having two electrical contact pins which are arranged in a respective plugin shaft and have an electrically insulating cap. After attachment of the plugin modules it is then for example not possible to inadvertently touch the contact pins of the high-voltage connection with a finger or a tool.

An embodiment of the plugin module according to the invention provides that at least one control connection is provided, which is configured for respectively connecting a contactor, and which is coupled with a control device of the battery management system, which control device is configured for controlling the switching contactor. Such a control connection is also referred to as a BJB (Battery Junction Box). By providing such a control connection it is possible to control contactors for example for an emergency shutdown or for separation of an electrical connection inside the motor vehicle battery from the battery management system of the plugin module.

In order to connect the electrical contacts of each contact pair with each other, i.e., for example to accomplish a serial connection of the battery modules, the connector of the plugin module has according to an embodiment a rigid metal plate via which one respective electrical contact of a contact pair of a contact filed is galvanically coupled with an electrical contact of a contact pair of another connection field. Hereby all contact pairs are preferably connected in series with each other. The metal profile parts have the advantage that they can be rigidly connected with the housing of the plugin module so that when plugging the plugin modules onto the battery modules a reliable force transmission is ensured.

As mentioned above the invention also includes a motor vehicle. The motor vehicle according to the invention is preferably configured as a car, in particular a passenger car. The motor vehicle according to the invention is characterized in that it has at least one motor vehicle battery according to an embodiment of the motor vehicle battery according to the invention.

BRIEF DESCRIPTION OF THE DRAWING

In the following an exemplary embodiment of the invention is described. For this it is sown in respective schematic illustrations.

DETAILED DESCRIPTION OF PREFERRED EMBODIMENTS

The exemplary embodiment explained below is a preferred embodiment of the invention. However in the exemplary embodiment the described components of the embodiments represent respectively individual features of the invention, which have to be viewed independent of each other and which respectively refine the invention independent of each other and can thus also be viewed individually or in other combinations than the ones shown as part of the invention. In addition the described embodiment can also be modified by further ones of the already described features of the invention.

Figure 1:
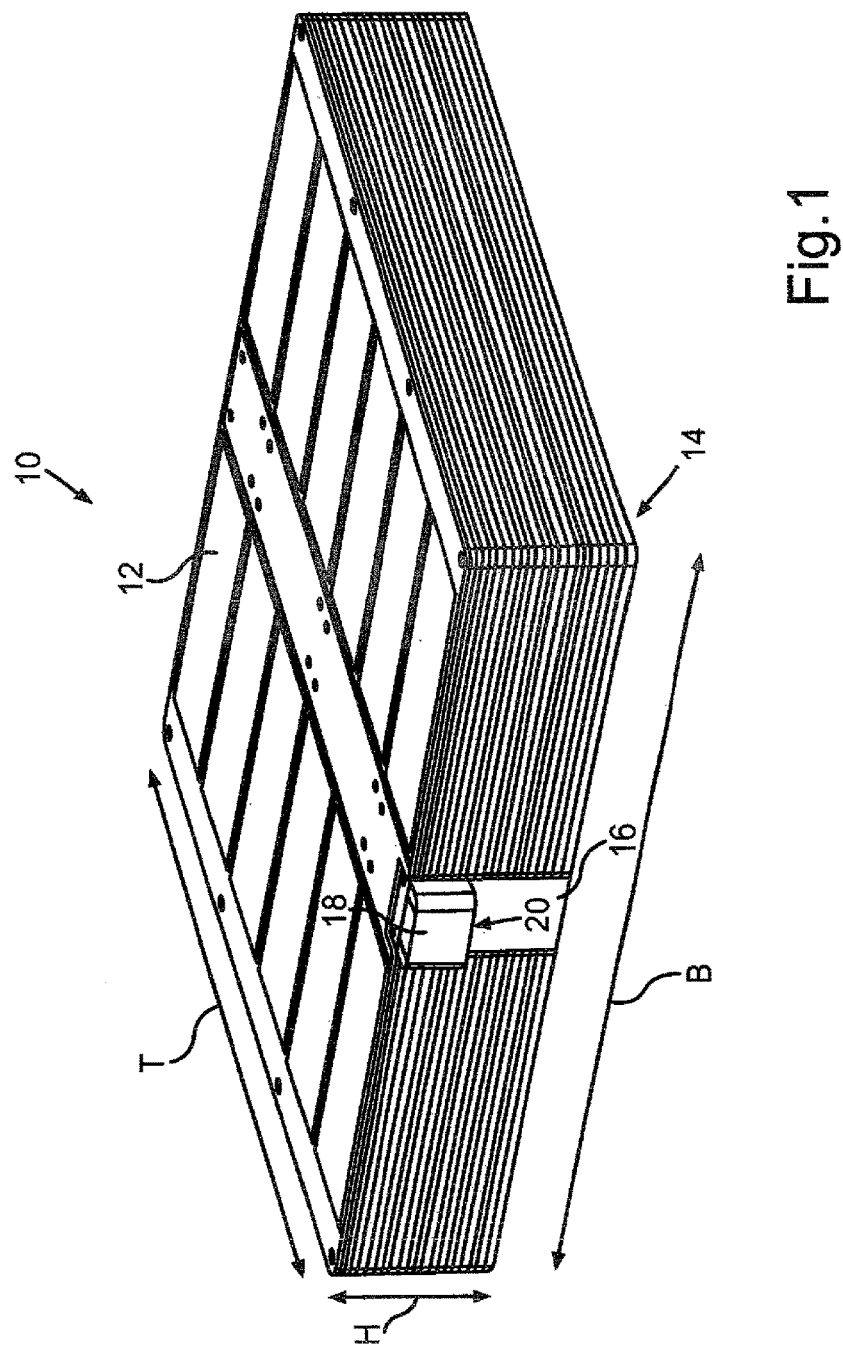
FIG. 1 an embodiment of the motor vehicle battery according to the invention.

FIG. 1 shows a motor vehicle battery, or short battery 10, which can be a high-voltage battery or traction battery. For example the battery 10 can be configured to generate a high voltage between 400 V and 500 V, for example 440 V. an operating current of the battery 10 can for example be in the range from 25 A to 45 A, for example 35 A or 37 A. A width b of the battery 10 can for example be within a range from 50 cm to 120 cm, for example in a range from 60 cm to 90 cm. A depth T can for example be in a range from 45 cm to 80 cm, for example in a range from 55 cm to 65 cm. A height H of the battery can for example be in a range from 10 cm to 25 cm in particular 10 cm to 20 cm.

The battery 10 is made from multiple battery modules 12, which can be stacked on top of each other to form a module stack 14. The number of the battery modules 12 in a motor vehicle battery 10 can be selected as needed depending on the required high-voltage and the required operating current.

Each battery module 12 can have the shape of a plate. The plates can be stacked on top of each other with their broadsides. The battery modules 12 can be connected with each other by a plugin module 16. The plugin module 16 can further have a connection device 18, which can have a high-voltage connection 20 on which the high voltage generated by the battery 10 is tapped or withdrawn. The high voltage is a sum voltage formed by the partial voltages or module voltages of the individual battery modules 12. Each battery module 12 can generate an electrical voltage, i.e., the module voltage, which in the context of the invention is a low-voltage.

By plugging the plugin module 16 onto the module stack 14 the modules 12 can be connected with each other in a single work step so that only at the point when the plugin module 16 is attached the high voltage is generated at the high-voltage connection. Up to this point it was possible to stack the battery modules 12 on top of each other to form the module stack 14 without taking special precautions for protection against high-voltage.

Figure 2:
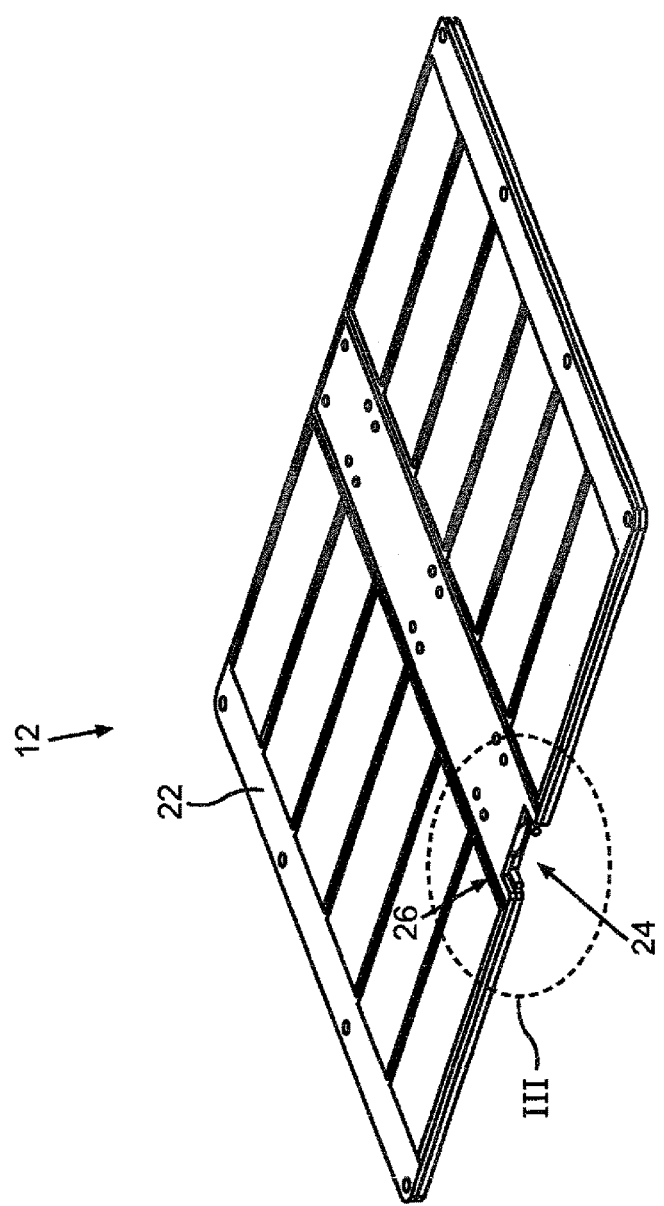
FIG. 2 an individual battery module of the motor vehicle battery.

FIG. 2 shows an individual battery module 12. Each of the battery modules 12 of the module stack 14 can be configured in the same manner. The battery module 12 can have a module housing 22 made of an electrically insulating material for example a plastic. The battery module 12 can have a plug connection 24 onto which the plugin module can be plugged. The plug connection 24 can be arranged in a recess of the housing 22 so that the plugin module 16 can be inserted in the recess 26.

Figure 3:
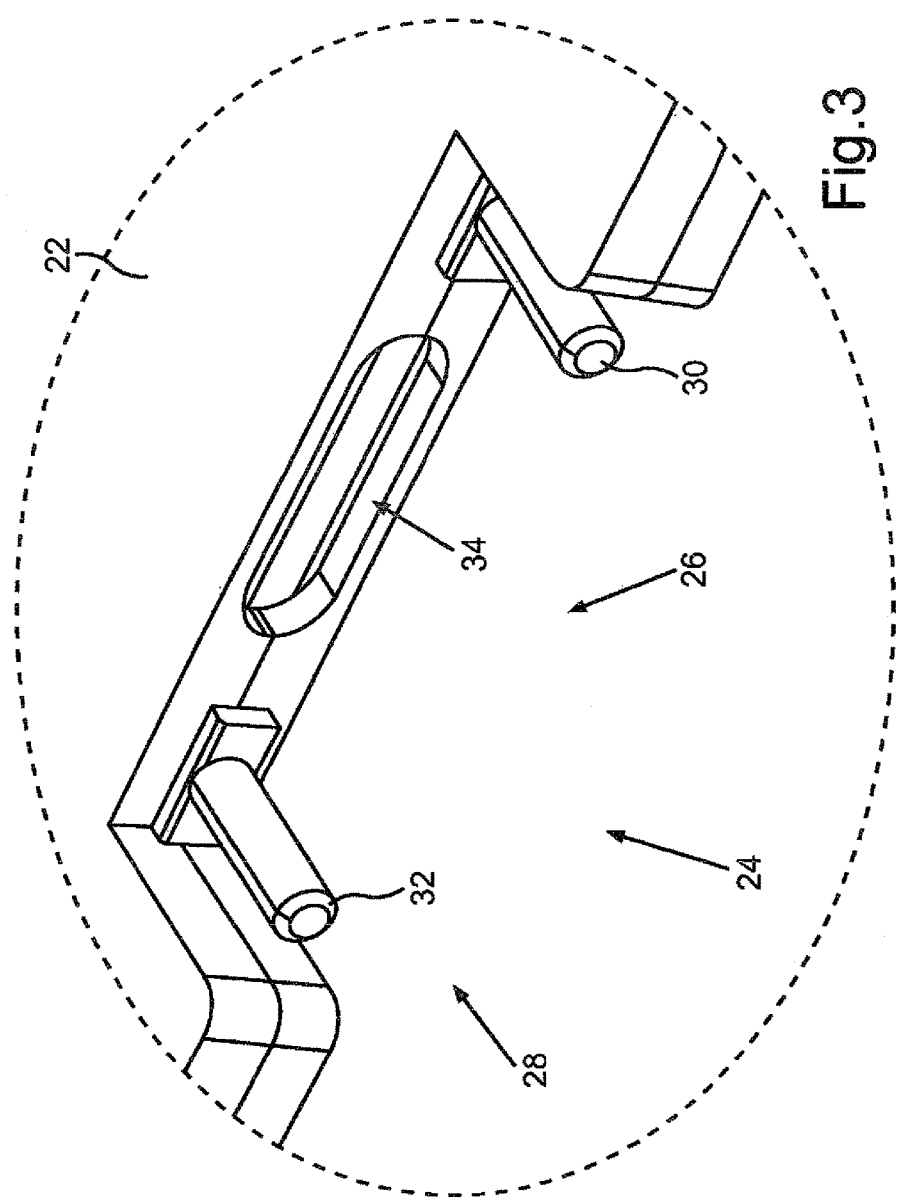
FIG. 3 a plug connection of the battery module.

FIG. 3 shows the plug connection 24 as an enlarged section of FIG. 2. The plug connection 24 can have a voltage tap 28 with a plus pole 30 and a minus pole 32 and also a bus connection 34. On the voltage tap 28 the module voltage can be tapped. Via the bus connection 34 the plugin module can be coupled with a control circuit of the battery module 12, which control circuit can be arranged in the housing 22.

Figure 4:
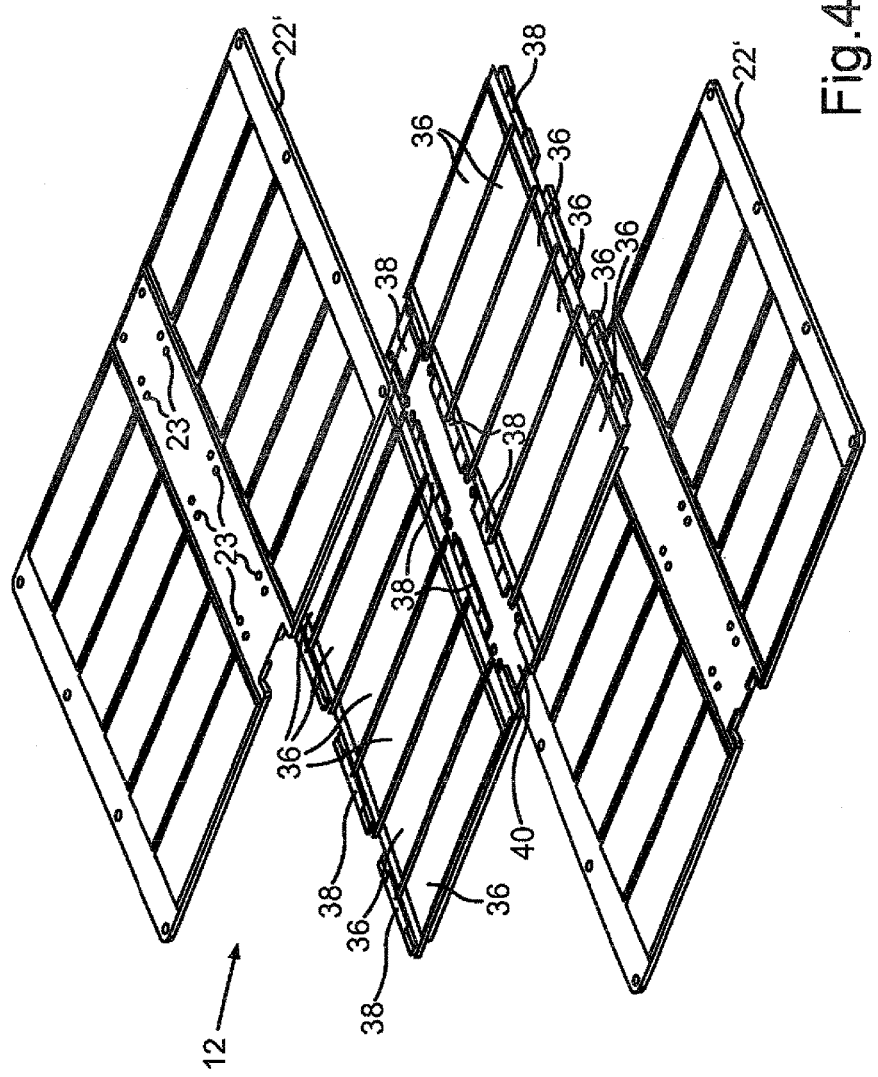
FIG. 4 an exploded view of the battery module.

FIG. 4 shows the internal construction of the battery module 22. The housing 22 can be formed by two housing shells 22', which surround battery cells 36 and the control circuit 38. The battery cells 36 can for example be lithium-ion battery cells. The battery cells 36 can be constructed as film cells. The battery cells 36 can be configured prismatic. The battery cells 36 can be glued onto the housing parts 22.

The battery cells 36 can be connected with connection elements 38, for example metal brackets, so as to form a serial connection, whereby the cell voltages add up to the module voltage. The battery cells 36 can be monitored by a control circuit 40. The control circuit 40 can be configured in a known manner as Cell-Module Controller CMC.

The housing parts 22' can advantageously have through-openings 23 which enable air exchange between a battery environment and the module interior and with this cooling of an internal space of the battery module 12.

Each individual battery module 12 can be manufactured individually and can be provided as a finished part for assembly of the motor vehicle battery.

Figure 5:
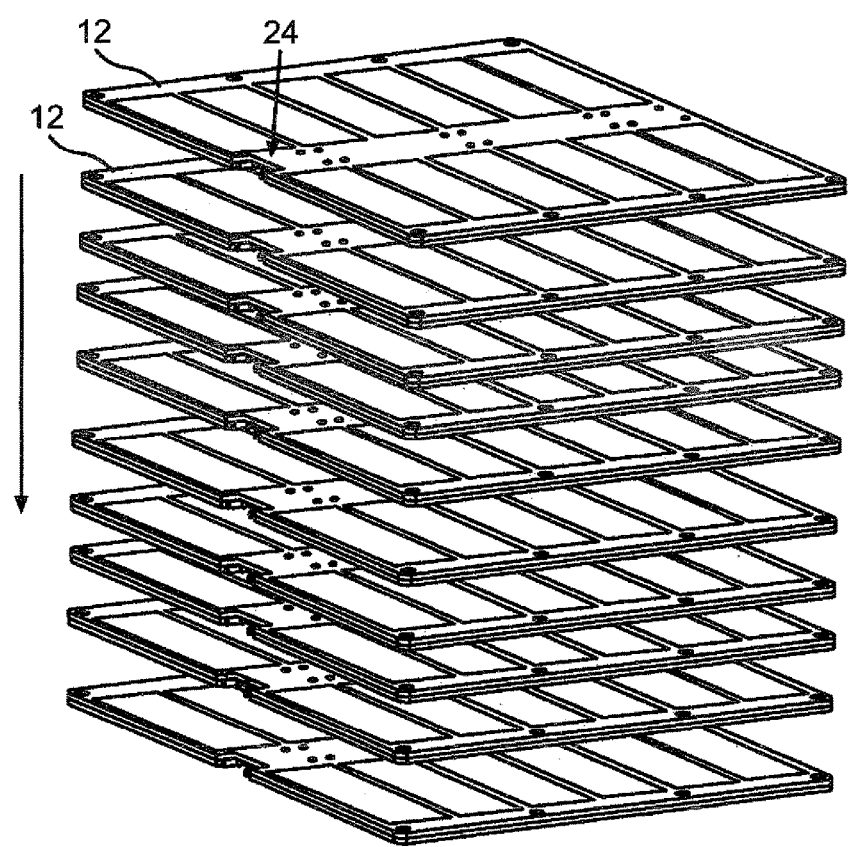
FIG. 5 the battery modules of the motor vehicle battery during a manufacturing step, FIG. 6 the battery modules during a further manufacturing step, FIG. 7 a plugin process during the production of the motor vehicle battery by which the battery modules are connected with each other by means of the plugin module, FIG. 8 the plugin process from another perspective, FIG. 9 a plugin side of the plugin module, FIG. 10 a connection device of the plugin module for outputting a high voltage of the motor vehicle battery, FIG. 11 a plugin contact of the connection device, FIG. 12 the plugin module during assembly thereof, FIG. 13 an exploded view of the plugin module, FIG. 14 individual components of the plugin module prior to assembly, FIG. 15 a connector arranged in the plugin module, FIG. 16 a metal section which is provided in the connector.
Figure 6:
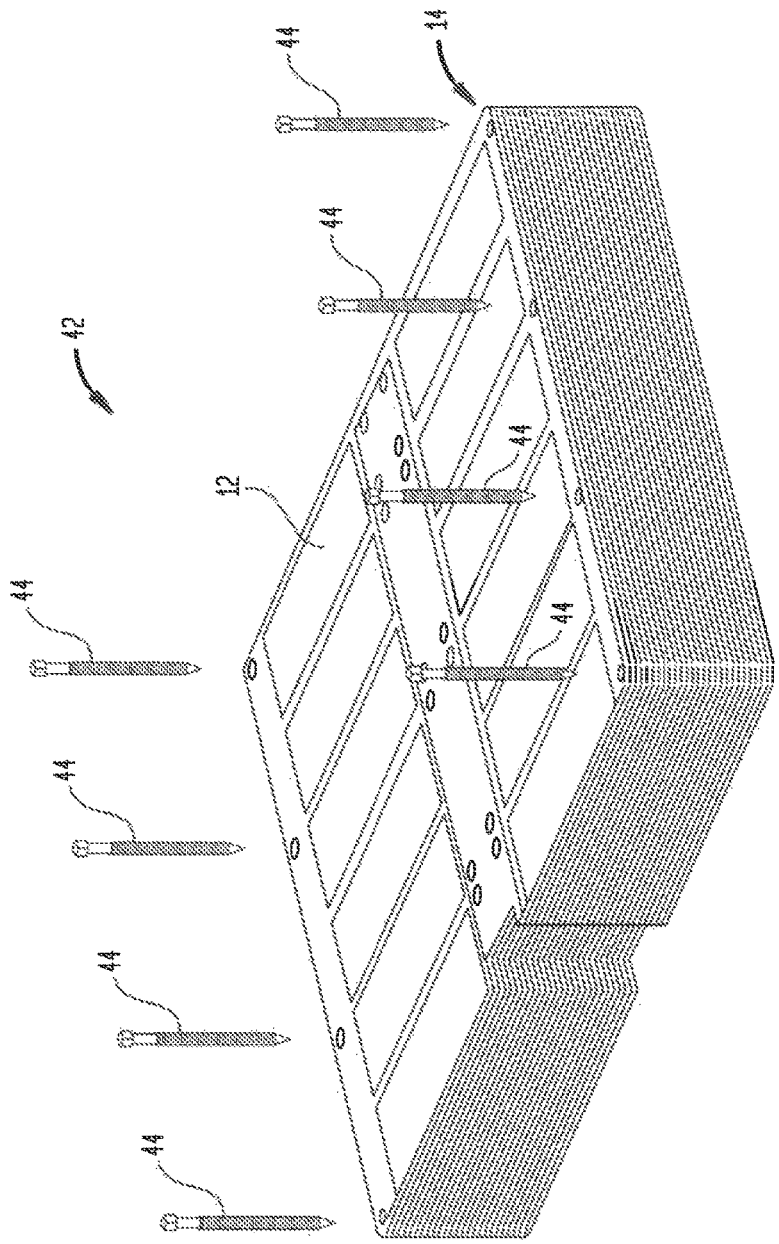

FIG. 5 shows how the battery modules 12 can be stacked on top of each other. Hereby the plug connections 24 are arranged aligned with each other, i.e., adjacent each other. The stacking of the battery modules 12 results in the module stack 14, which is again shown in FIG. 6. The battery modules can be fixed in each other by means of a fastening device 42. For example after the stacking the battery modules 12 are screwed and fixed on a floor plate of a (not shown) motor vehicle with screws 44. The voltage range of this partially assembled motor vehicle battery is hereby still in the low voltage range.

Figure 7:
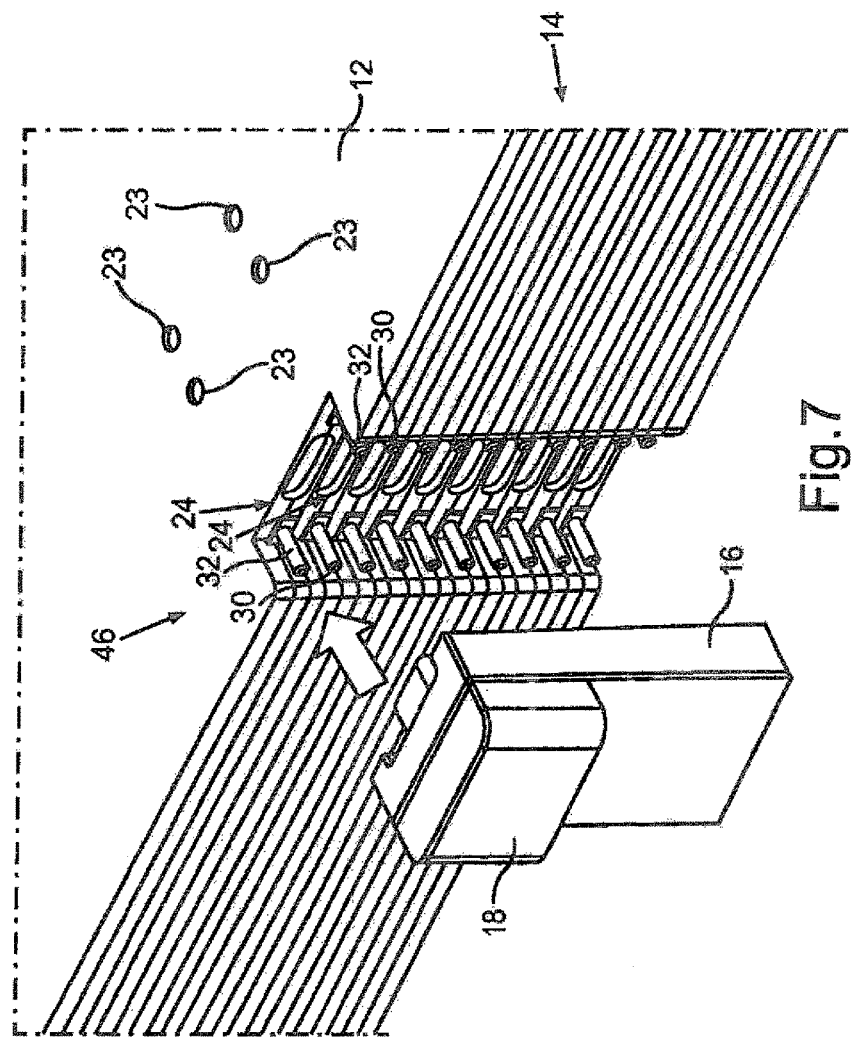

FIG. 7 shows the final assembly step in which the plugin module 16 was arranged on the plug connections 24 of the individual battery modules 12, which individual plug connections have been arranged to form a plugin region 46. The module stack 14 can hereby be formed so that in the plug connections of neighboring battery modules 12 the plus pole 30 and the minus pole 32 are respectively arranged with a lateral offset relative to each other as shown in FIG. 7 for the two upper battery modules 12.

Figure 8:
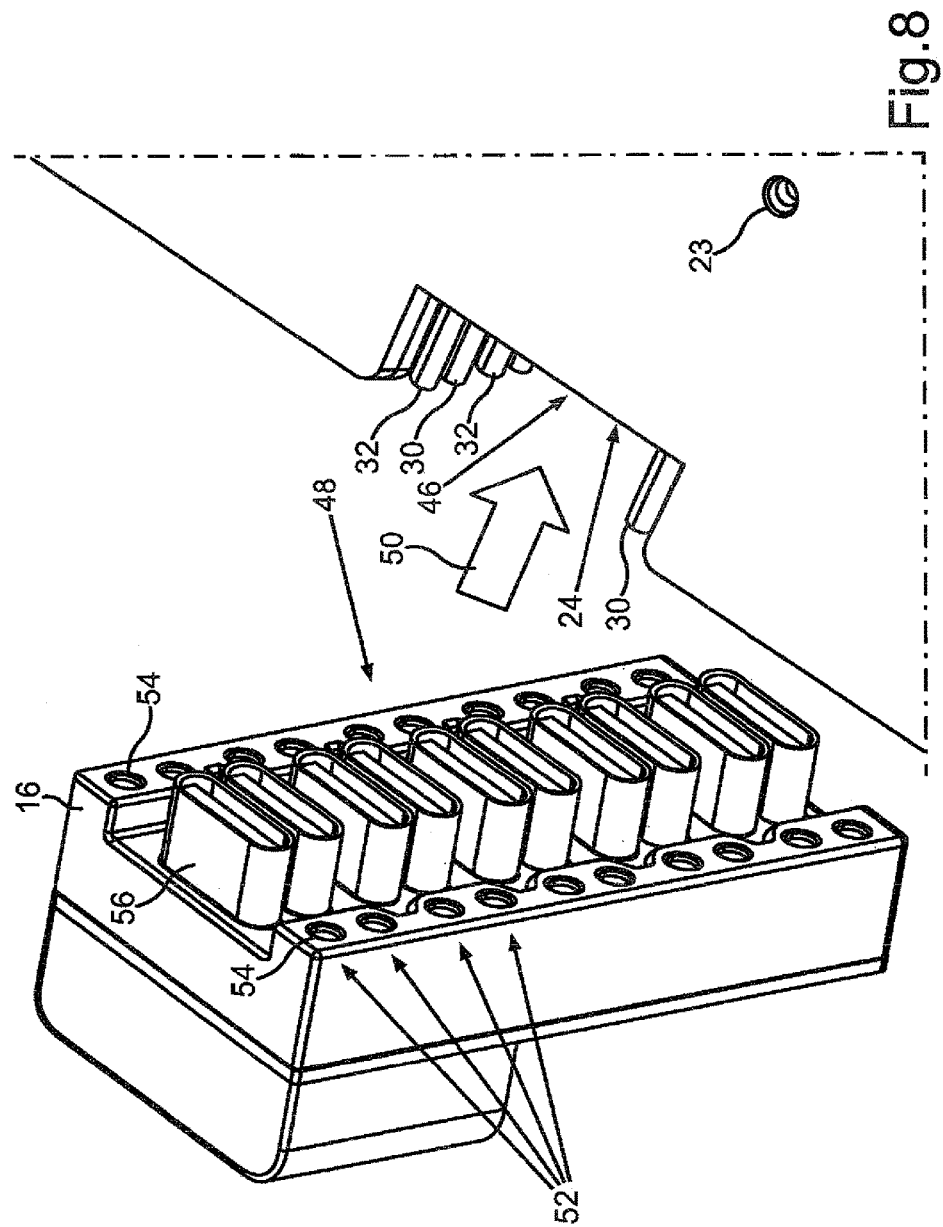

FIG. 8 shows the plugin process from another perspective. The plugin module 16 is inserted into the plugin region 46 with a plugin side 48 with a plugin movement along the plugin direction 50.

The plugin side 48 can have a connection field 52 for each plug connection 24 in the plugin region 46, wherein in FIG. 8 only some of the connection fields are provided with a reference numeral for the sake of clarity. This connection field 52 can have a contact pair 54 and a bus connection 56. The contact pair 54 can be pushed onto the plus pole 30 and the minus pole 32 of a respective voltage tap of a plug connection 24. The bus connection 26 can be pushed onto the bus connection 34 of the same plug connection 24. The plugin movement along the plugin direction 50 allows simultaneously pushing all connection fields 52 onto the corresponding plug connections 24 in the plugin region 46. With this the battery assembly is complete and a high voltage is present at the connection device.

Figure 9:
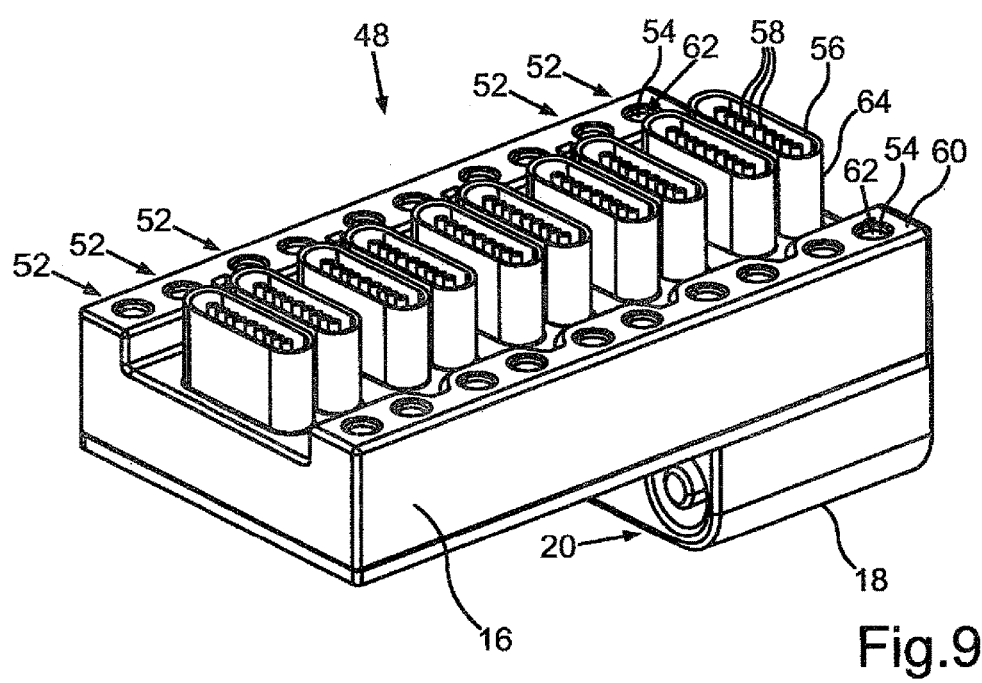

FIG. 9 shows how each bus connection 56 of a connection field 52 can have one or multiple bus contacts 58 for electrically contacting a corresponding electrical bus line of the bus connection 34 of a plug connection 24 of a battery module 12. Each contact pair 54 can have two electrical contacts, which can be arranged in a housing 60 of the plugin module 16. The contact pairs can hereby be accessible from outside the plugin through through-openings 62 in the housing module 16. In this way the plus poles 30 and the minus poles 32 can be pushed through the through-openings 62 into the housing 16 and can thereby be connected to or contacted with the contacts of the contact pair 54. This has the advantage that no electrically conductive element is present outside the plugin module 16 when the high-voltage is generated during insertion of the plugin module into the plugin region 46 by the plugin movement 50. Also each bus connection 56 can have a shaft wall 64, which on one hand provides a movement guide during the plugging in and on the other hand prevents voltage arcs from the contact pairs 54 to the bus contacts 58.

Figure 10:
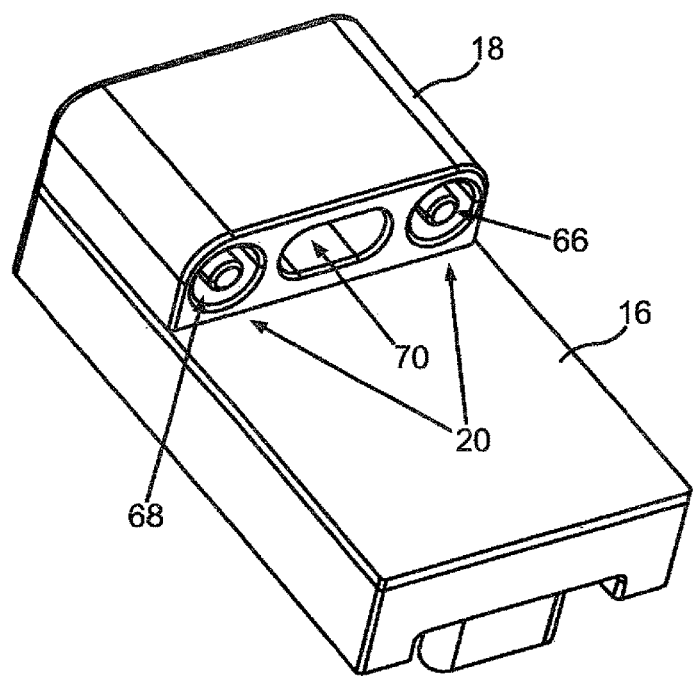

FIG. 10 shows a rear side of the plugin module 16, which is located opposite the plugin side 48 with the connection device 18. The connection device 18 provides the high-voltage connection 20, which can have a high-voltage plus contact 66 and a high-voltage minus contact 68. The connection device 18 can additionally have a communication bus connection 70 via which the plugin module 16 can be connected with a communication bus of a motor vehicle, for example a CAN-Bus (CAN-Controller Area Network). The high voltage of the motor vehicle battery 10 drops off between the high-voltage plus contact 66 and the high-voltage minus contact 68.

Figure 11:
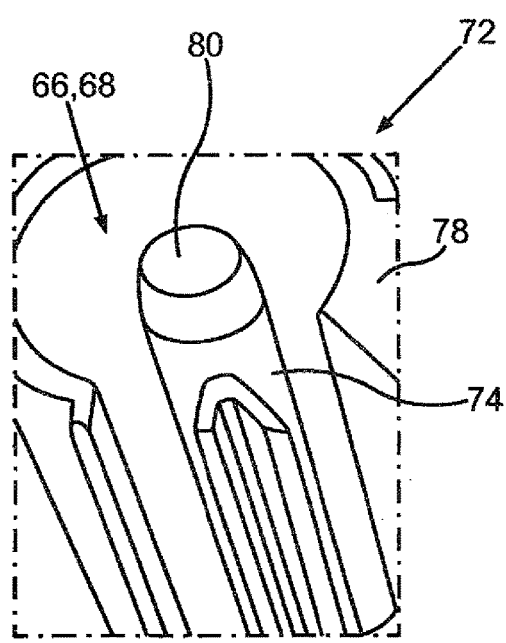

FIG. 11 shows a touch-protection 72, which can be respectively provided at the high-voltage plus contact 66 and the high-voltage minus contact 68 in the connection device 18. The high voltage plus contact 66 and the high voltage minus contact 68 can be provided by a metal pin 74 or another contact element 74, which can for example be arranged in a shaft 76 made of an electrically insulating shaft wall 78, for example a plastic shaft. Toward a shaft opening an electrically insulating cap 80 can be arranged on the contact element 74. This makes it impossible to insert a finger or a tool into the shaft 76 and to thereby generate an electrical connection to the contact element 74. This also reliably avoids a technician from coming into contact with an electrically conducting element that is under high voltage after plugging the plugin module onto the module stack 14.

Figure 12:
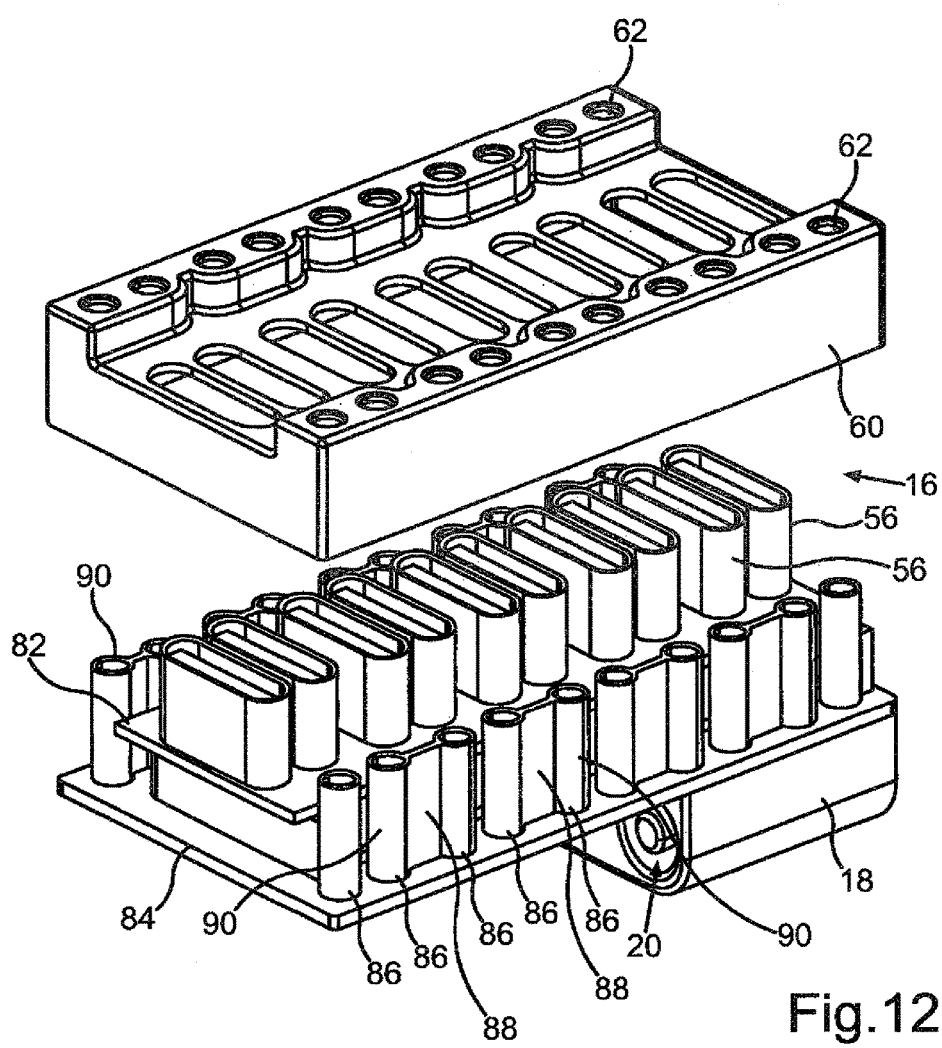

FIG. 12 shows the plugin module 16 during an assembly phase. In the housing 60 a carrier plate 82 can be provided on which the bus connections 567 can be arranged. The carrier plate 82 can also have conductor paths for connecting the bus contacts 58. The connector 84 can provide the electrical contacts 86 of the contact pairs 54. Contacts 86 of neighboring connection fields 52 can be connected with each other by an electrically conductive bridge element 88. Overall in this way two contacts 86 and a bridge element 88 can be provided by an electrically conductive profile element 90, which can for example be made of aluminum.

Figure 13:
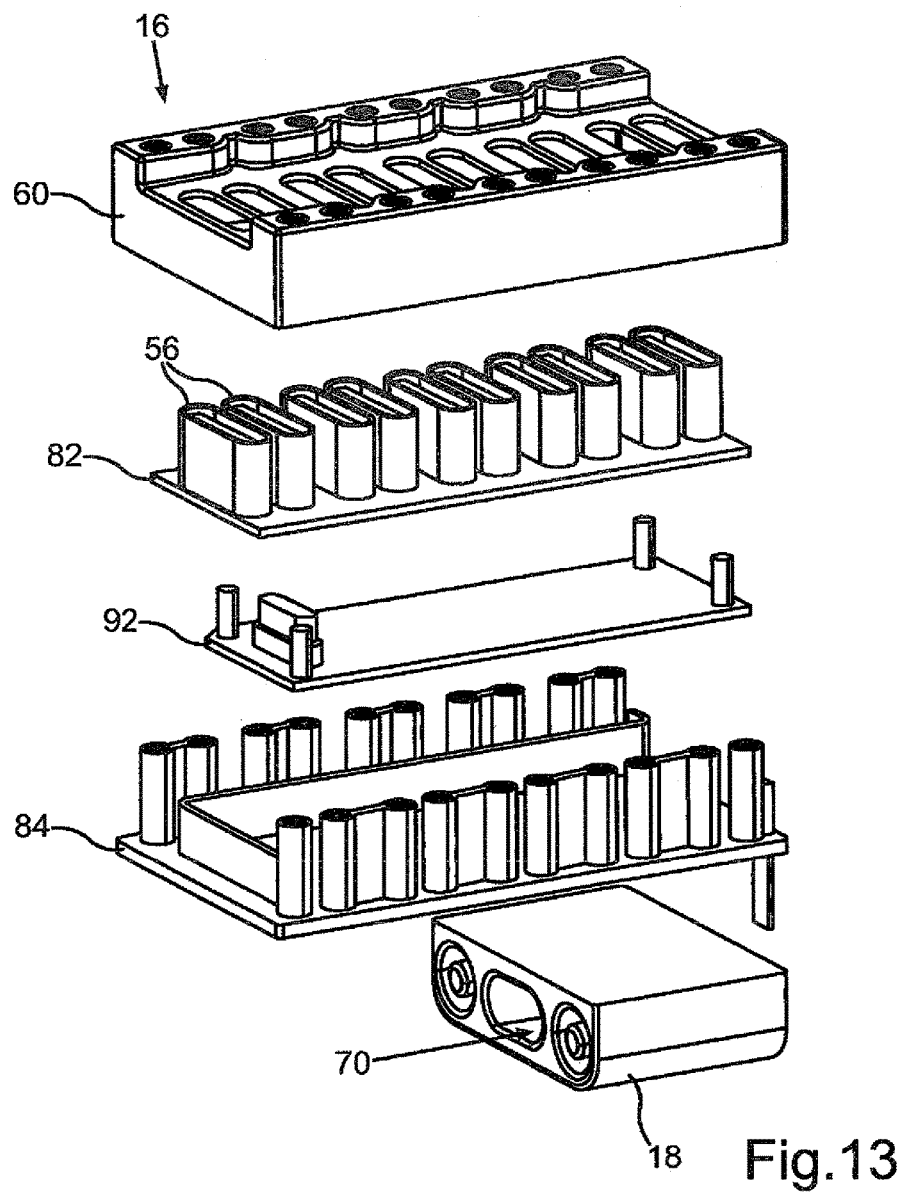

FIG. 13 shows the elements of the plugin module 16 once more individually. Via the carrier plate 82 the bus connections 56 can be electrically connected with a battery management system 92, which can also be integrated in the plugin module 16. The battery management system 92 can exchange data with the control circuits 40 of all battery modules 12 via the bus connections 56 and thereby control the motor vehicle battery in a known manner. The battery management system 92 can also be coupled with the communication bus connection 70 so that the battery management system 92 can also exchange data with the communication bus of the motor vehicle.

Figure 14:
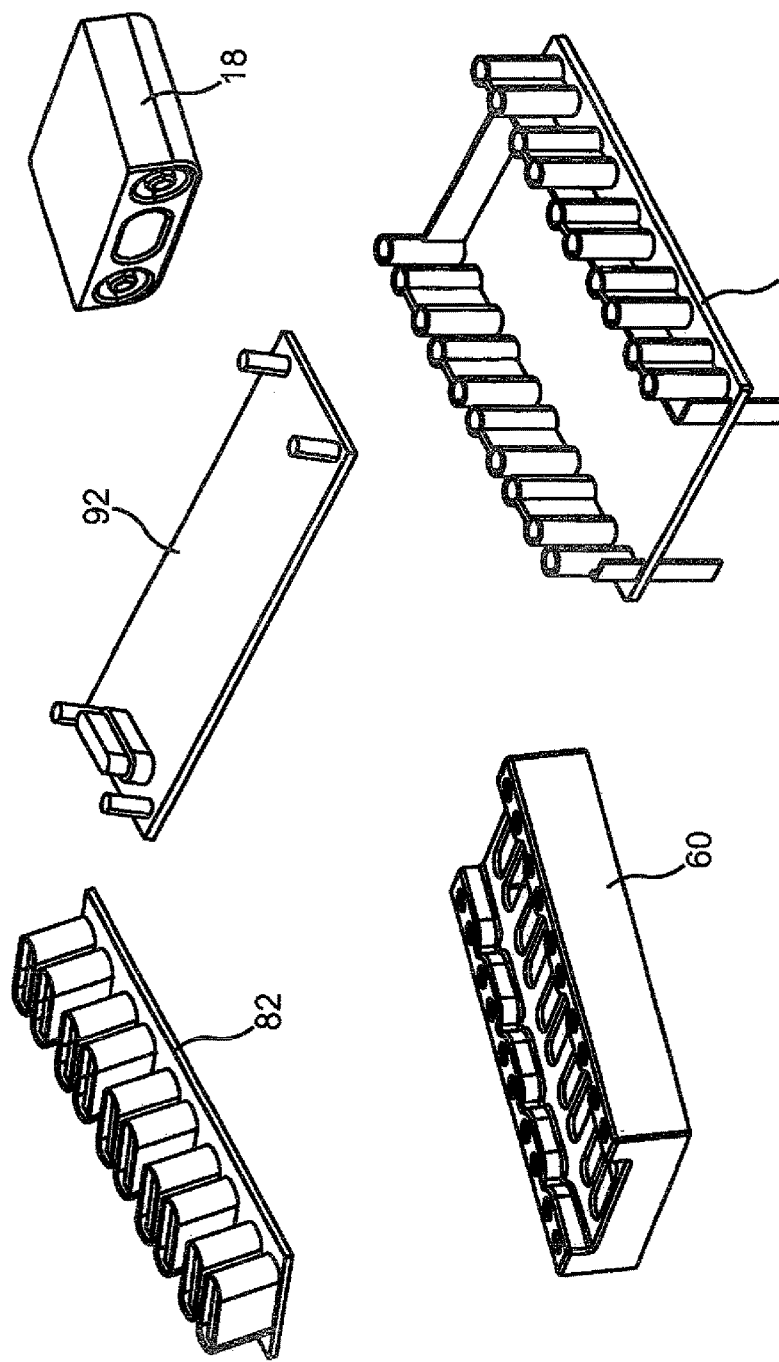

FIG. 14 again shows the individually producible elements of the plugin module 16.

Figure 15:
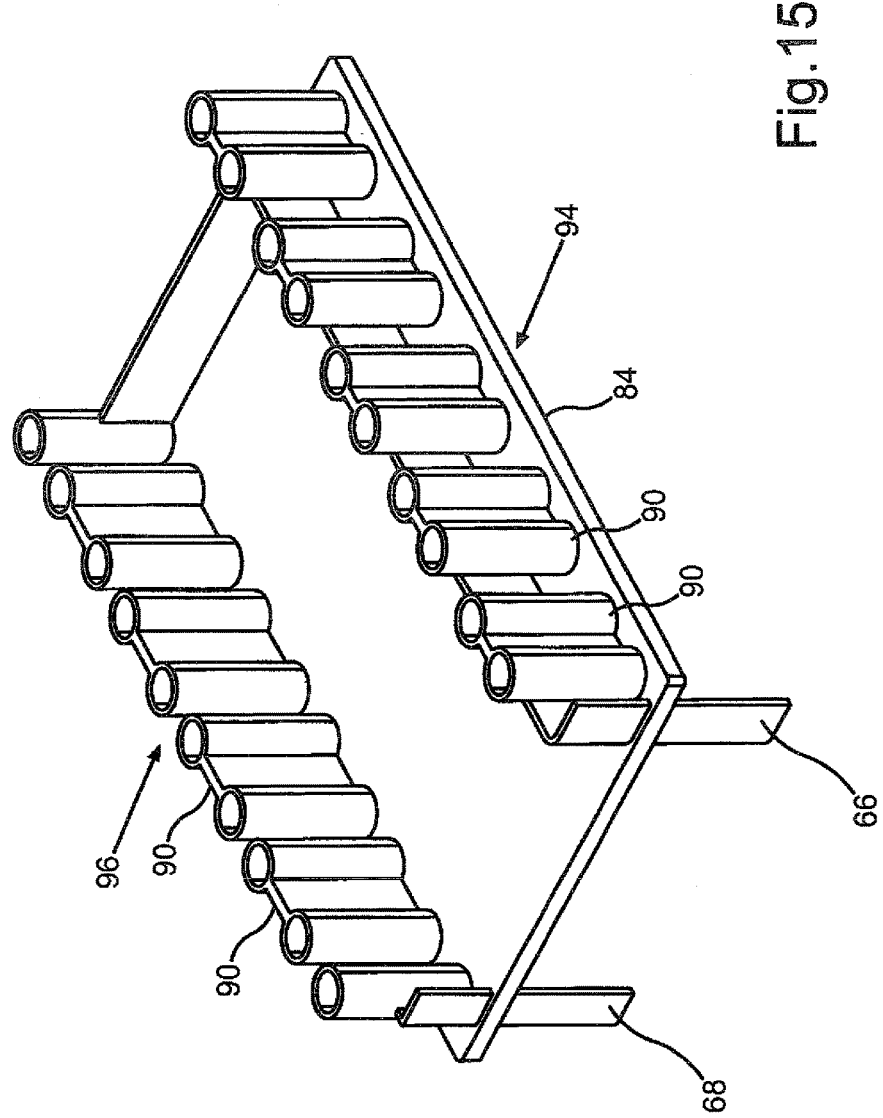

FIG. 15 shows the connector 84. The profiles 90 of opposing sides 94, 96 of the connector 84 can be arranged offset relative to each other so that on the side 94 and the side 96 respectively contacts 86 of neighboring connection fields 52 are each alternately connected by a bridge element 88 and thereby the voltage taps 28 of the plug connections 24 of the individual battery modules 12 are connected in series. A total voltage of the module voltages then drops off between the high-voltage contacts 66, 38. As shown in FIG. 10 the high-voltage contacts 66, 88 are configured in the connection device 18. The connector 84 can also be used to accomplish a parallel connection of two or multiple battery modules 12. For this purpose other connections of the contacts 86 have to be provided.

Figure 16:
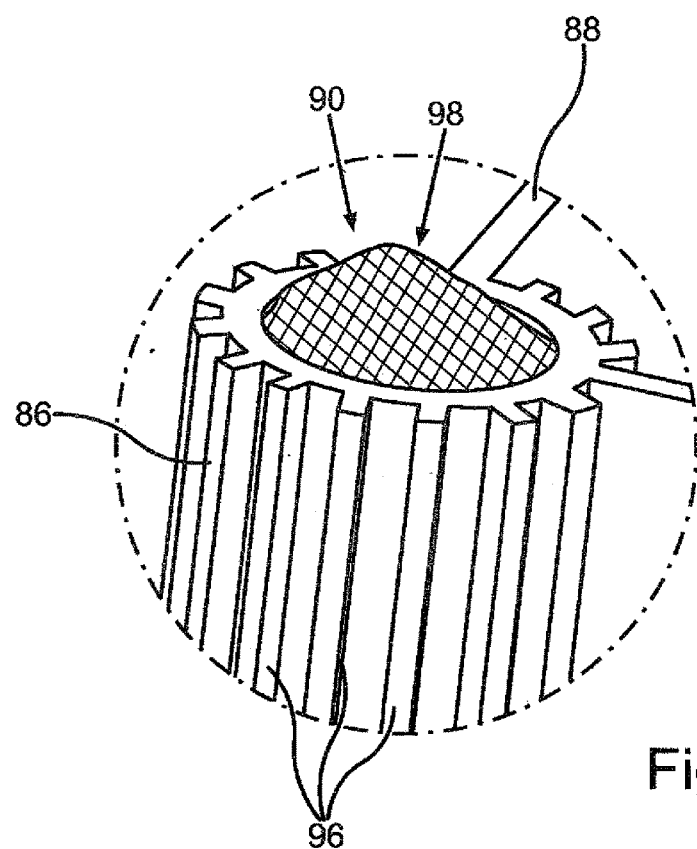

FIG. 16 shows how each individual contact 86 of the profiles 90 can be formed as a plugin shaft made of an electrically conductive material. Each contact 86 can have cooling ribs 96, which prevent overheating of the profiles 90 in the event of a current flow at or above the nominal current strength for extended periods of time, for example longer than 10 minutes. In each shaft a mesh 98 made of an electrically conductive wire can be arranged. The mesh 98 can ensure a large surface contacting of the plus poles 30 and minus poles 32 of the voltage taps 28 of the individual battery modules 12 with the shaft walls of the contact 86 of each profile 90.

The motor vehicle battery can be mounted so that the battery modules can be connected with each other under touch-protected conditions. Hereby it is proven that also the function of the low voltage connection of the control circuits of the battery modules 12 and the high voltage cabling by means of the connector 84 and the provision of a battery management system 92 can be integrated in a component, i.e., the plugin module 16.

The mesh 98 can for example be made of a hyperboloid so that it smoothly surrounds an electrical contact when the electrical contact is inserted. The mesh can be positioned or fixed on a plastic carrier by means of which the mesh can be attached in a respective shaft of a contact 86 without unwanted deformation.

The example thus shows a module construction, which is configured flat with prismatic lithium ion cells. The module further provides the connection for a plugin module. As a result of a full touch-protection solution with function integration this new idea enables accommodation the components for the high-voltage connection, the low-voltage connection for the bus connection, a battery management system and a high-voltage plug connection in the plugin module. When sufficient installation space is available even the function of a battery junction box can be integrated in this plugin module. Advantageously full touch-protection in the high-voltage range is thus already ensured during assembly, the post work and during service. The plugin module provides a component instead of five different components in order to connect the battery modules with each other. This simplifies assembly. Compared to a conventional motor vehicle battery installation space and weight are saved. Another result are lower costs for development and component acquisition. As a result of the saved volume multiple motor vehicle batteries can be provided in a motor vehicle without having to create more installation space, which advantageously increases the range of an electric vehicle.

Overall the example shows how the invention can provide a high voltage plugin module with integrated battery management-low voltage and high-voltage plug.

The invention claimed is:

1. A motor vehicle battery, comprising:
   multiple battery modules arranged in a row adjacent each other, each said multiple battery modules comprising a plug connection, a voltage tap and a bus connection integrated in the plug connection the bus connection having a singular oblong shape with parallel longitudinal sides and curved end sides, and a control circuit coupled with the bus connection, and multiple galvanic battery cells, each of said multiple galvanic battery cells being connected witch each other by the plug connection; and
   a connection device configured as a single plugin module and comprising a battery management system, said connection device being plugged onto all plug connections of the multiple battery modules and connecting the voltage taps of all battery modules with a high-voltage battery connection and connecting the bus connections of all battery modules with the battery management system.

2. The motor vehicle battery of claim 1, further comprising a housing provided for each of the wherein multiple battery modules.

3. The motor vehicle battery of claim 1, wherein the battery cells are configured as film cells and wherein each of the battery modules is configured as a flat plate.

4. A plugin module for a motor vehicle battery, comprising:
   a housing having a plugin side, said plugin side having multiple neighboring connection fields each of the connection fields having an electrical contact pair and a bus connection, the bus connection having a singular oblong shape with parallel longitudinal sides and curved end sides;
   a connection device arranged in the housing for electrically connecting the contact pairs of the connection fields with each other,
   a battery management system arranged in the housing and coupled with the bus connection of all contact fields, and
   a connector having a high-voltage connection arranged on the housing for outputting a high voltage formed via the connected connection fields in the connection unit).

5. The plugin module of claim 4, wherein in each of the contact fields the contact pair is formed by two contacts arranged in a respective insertion shaft.

6. The plugin module of claim 4, wherein the high-voltage connection has two electrical contact pins, which are arranged in a respective insertion shaft and have an electrically insulating cap.

7. The plugin module of claim 4, wherein the connection device has rigid metal profile parts by which a respective one of the electrical contacts of a contact pair of one of the connection fields is galvanically coupled with an electrical contact of a contact pair of another one of the connection fields.

8. The plugin module of claim 4, further comprising at least one control connection configured for connecting a respective contactor, said control connection being coupled with a control circuit of the battery management system which is configured for controlling the respective contactor.

9. A motor vehicle, comprising:
   a motor vehicle battery, said motor vehicle battery comprising
   multiple battery modules arranged in a row adjacent each other, each said multiple battery modules comprising a plug connection, a voltage tap and a bus connection integrated in the plug connection, and a control circuit coupled with the bus connection, the bus connection having a singular oblong shape with parallel longitudinal sides and curved end sides, and multiple galvanic battery cells, each of said multiple galvanic battery cells being connected witch with each other by the plug connection, wherein all; and
   a connection device configured as a single plugin module and comprising a battery management system, said connection device being plugged onto all plug connections of the multiple battery modules and connecting the voltage taps of all battery modules with a high-voltage battery connection and connecting the bus connections of all battery modules with the battery management system.

10. A method for producing a motor vehicle battery, comprising:
    stacking multiple battery modules, each said multiple battery modules comprising a plug connection, a voltage tap and a bus connection integrated in the plug connection, the bus connection having a singular oblong shape with parallel longitudinal sides and curved end sides, and a control circuit coupled with the bus connection, and multiple galvanic battery cells, each of said multiple galvanic battery cells being connected with each other by the plug connection, wherein during said stacking the plug connections of the battery modules are separated from each other;
    orienting the plug connection of all said multiple battery modules adjacent each other; and
    plugging a connection device configured as a single plugin module and comprising a battery management system onto the stacked battery modules, thereby simultaneously connecting the voltage taps of all said multiple battery modules and coupling the bus connections with the battery management system.

* * * * *